(12) United States Patent
Takahashi

(10) Patent No.: US 8,616,778 B2
(45) Date of Patent: Dec. 31, 2013

(54) ROLLING BEARING APPARATUS

(75) Inventor: Osamu Takahashi, Kashiba (JP)

(73) Assignee: JTEKT Corporation, Osaka (JP)

( * ) Notice: Subject to any disclaimer, the term of this patent is extended or adjusted under 35 U.S.C. 154(b) by 94 days.

(21) Appl. No.: 13/255,185

(22) PCT Filed: Apr. 2, 2010

(86) PCT No.: PCT/JP2010/056076
§ 371 (c)(1),
(2), (4) Date: Sep. 7, 2011

(87) PCT Pub. No.: WO2010/116954
PCT Pub. Date: Oct. 14, 2010

(65) Prior Publication Data
US 2013/0129270 A1    May 23, 2013

(30) Foreign Application Priority Data

Apr. 6, 2009  (JP) .................... 2009-092270
Mar. 19, 2010 (JP) .................... 2010-064395

(51) Int. Cl.
*F16C 19/50* (2006.01)
(52) U.S. Cl.
USPC ..................................................... 384/476
(58) Field of Classification Search
USPC ................ 384/313–317, 321, 476, 467
See application file for complete search history.

(56) References Cited

U.S. PATENT DOCUMENTS

| | | | |
|---|---|---|---|
| 3,645,593 A | 2/1972 | Irwin | |
| 4,838,041 A * | 6/1989 | Bellows et al. | 62/51.2 |
| 5,019,880 A * | 5/1991 | Higgins, III | 257/714 |
| 5,132,780 A * | 7/1992 | Higgins, III | 257/722 |
| 5,155,579 A * | 10/1992 | AuYeung | 257/722 |
| 5,186,547 A * | 2/1993 | Muhl et al. | 384/480 |
| 5,597,034 A * | 1/1997 | Barker et al. | 165/80.3 |
| 5,915,843 A * | 6/1999 | Mattera | 384/316 |
| 7,273,090 B2 * | 9/2007 | Crocker et al. | 165/104.33 |
| 2006/0185835 A1 * | 8/2006 | Matsuzaki et al. | 165/166 |

FOREIGN PATENT DOCUMENTS

| | | |
|---|---|---|
| JP | B1-48-9855 | 3/1973 |
| JP | U1-52-106747 | 8/1977 |
| JP | A-64-30925 | 2/1989 |
| JP | U-1-60025 | 4/1989 |
| JP | Y2-4-13455 | 4/1989 |
| JP | A-2001-107977 | 4/2001 |

OTHER PUBLICATIONS

International Search Report mailed May 11, 2010 issued in International Patent Application No. PCT/JP2010/056076 (with translation).
Sep. 9, 2013 Office Action issued in Japanese Patent Application No. 2010-064395 w/ partial translation.

* cited by examiner

*Primary Examiner* — Alan B Waits
(74) *Attorney, Agent, or Firm* — Oliff & Berridge, PLC

(57) ABSTRACT

A rolling bearing apparatus capable of restraining the residence of air bubbles in the water-cooling jacket while curbing the running cost and the production cost is provided. A rolling bearing apparatus is configured to include a rolling bearing, and a housing which houses the rolling and in which a water-cooling jacket into which cooling water is introduced. By forming the bottom portion of the water-cooling jacket by an inclined surface in the axial direction, it is possible to preferably rectify the cooling water in the water-cooling jacket and therefore effectively restrain the residence of air bubbles without increasing the amount of water supplied to the water-cooling jacket.

2 Claims, 6 Drawing Sheets

ROLLING BEARING APPARATUS

TECHNICAL FIELD

The invention relates to a rolling bearing apparatus for supporting a roll that is for use in a continuous casting facility or the like.

BACKGROUND ART

Conventionally, among rolling bearing apparatuses for supporting a drive roll in a continuous casting facility, there is an apparatus that has a housing which houses a rolling bearing and in which a water-cooling jacket is formed.

The water-cooling jacket is formed in a surface of the housing, which faces a slab side, and is formed of a recess portion that is indented radially inward from an outer peripheral surface of the housing, and a lid that, together with the recess portion, forms a space into which cooling water is introduced, by closing the recess portion. A water supply opening is formed in one end portion of the recess portion in a circumferential direction, and a water discharge opening is formed in the other end portion thereof in the circumferential direction. By introducing cooling water into the space through the water supply opening and discharging it from the water discharge opening, the housing is cooled to prevent heat radiated from a slab from being transferred to the rolling bearing (see, e.g., Patent Document 1).

Besides, there is also an apparatus as shown in FIG. 9 in which a recess portion 101 is formed on an outer peripheral surface of a housing 100 whose section is in a circular arc shape, and paired water supply openings 102 are formed in respective corner portions of the recess portion 101 that are at one end side of the recess portion 101 in a circumferential direction, and paired water discharge openings 103 are formed in respective corner portions of the recess portion 101 that are at the other end side of the recess portion 101 in the circumferential direction, and which is constructed such that the cooling water can be introduced evenly in the axial directions and the circumferential direction while a constant amount of flow is secured.

In the foregoing related-art rolling bearing apparatus, there are cases in which air bubbles occur and reside inside the water-cooling jacket. In particular, in the water-cooling jacket formed of the recess portion 101 as shown in FIG. 9, paired water discharge openings 103 for discharging the cooling water introduced through the two water supply openings 102 are formed in the respective corner portions of the recess portion 101, so that the jacket has a problem that there is a tendency that the cooling water resides in an intermediate portion positioned between the pair of water discharge openings 103 (a portion shown by an interrupted line in FIG. 9) and that air bubbles occur and reside in that portion. If such air bubbles form and reside inside the water-cooling jacket, the cooling efficiency of the water-cooling jacket declines. Besides, if the water discharge openings 103 are clogged from any cause, the residing air bubbles may expand due to radiation heat from a slab, thus leading to a possibility of breakage of the water-cooling jacket.

If, to overcome the problem, for example, the amount of water supplied through the water supply openings is increased to increase the amount of flow of cooling water in the jacket, it is possible to restrain the residence of the air bubbles; however, this is not favorable from the viewpoint of running cost, since the amount of water supplied increases.

In connection with the residence of air bubbles inside the water-cooling jacket as described above, there has been proposed an apparatus in which a rib protruded toward the inside of the water-cooling jacket is formed on the recess portion of the housing or an inner surface of the lid, the dimension of the rib in the axial direction is gradually narrowed from respective end portions of the water-cooling jacket in the circumferential direction toward a middle thereof and therefore sharp changes in the section of the water-cooling jacket are eliminated in a space between the pair of water supply openings provided in the end portion of the water-cooling jacket in the circumferential direction and the pair of water discharge openings provided in the other end portion so as to smooth the flow of the cooling water and therefore prevent the residence of air bubbles (e.g., see Patent Document 2).

PRIOR-ART DOCUMENT

Patent Document

Patent Document 1: Japanese Patent Application Publication No. 64-30925 (JP-A-64-30925)
Patent Document 2: Japanese Patent Application Publication No. 2001-107977 (JP-A-2001-107977)

DISCLOSURE OF THE INVENTION

Problem to be Solved by the Invention

It is conceivable that as in the bearing apparatus described in Patent Document 2 described above, the residence of air bubbles is prevented by forming, in a bottom portion or a lid, a complicated water flow path for rectifying the cooling water. However, in order to form such a complicated flow path, a complicated process is needed, so that the production cost increases, which is unfavorable as in the foregoing case in which the amount of water supplied is increased.

Therefore, an object of the invention is to provide a rolling bearing apparatus capable of restraining the residence of air bubbles in the water-cooling jacket while curbing the running cost and the production cost.

Means for Solving the Problem

In relation to a rolling bearing apparatus that has a water-cooling jacket, the inventors of the present application did vigorous studies about a measure for restraining the residence of air bubbles in the water-cooling jacket by using a simple structure. In the course of the studies, the inventors paid attention to the configuration of the bottom portion of the water-cooling jacket, and performed various experiments. As a result, the inventors have found that, by forming the bottom portion of the water-cooling jacket by an inclined surface that is inclined in an axial direction, it is possible to preferably rectify the cooling water in the water-cooling jacket and therefore effectively restrain the residence of air bubbles without increasing the amount of water supplied, and have thus accomplished the invention.

That is, as for the invention, in a rolling bearing apparatus having a rolling bearing, and a housing which houses the rolling bearing and in which a water-cooling jacket into which cooling water is introduced is formed, wherein the water-cooling jacket is formed of: a recess portion that is indented radially inward from an outer peripheral surface of the housing and that has a bottom portion that extends along an outer periphery of the rolling bearing; and a lid that, together with the recess portion, forms a space into which the cooling water is introduced, by closing the recess portion, and wherein paired water supply openings are formed in respective corner portions at one end side of the recess portion in a circumferential direction, and paired water discharge openings are formed in respective corner portions at the other end side of the recess portion in the circumferential direction, the bottom portion is formed of: a first inclined surface that is inclined radially inward from a middle of the bottom portion in an axial direction toward one end portion of the bottom portion in the axial direction; and a second inclined surface that is inclined radially inward from the middle of the bottom portion in the axial direction toward the other end portion of the bottom portion in the axial direction.

According to the rolling bearing apparatus constructed as described above, since the bottom portion is formed of the first inclined surface that is inclined radially inward from the middle of the bottom portion in the axial direction toward the one end portion thereof in the axial direction and the second inclined surface that is inclined from the middle thereof in the axial direction toward the other end portion thereof in the axial direction, it is possible to cause the cooling water introduced into the water-cooling jacket from the paired water supply openings provided at the one end side in the circumferential direction to reach the other end side in the circumferential direction at which the paired water discharge openings are positioned, while rectifying the cooling water to the both sides in the axial direction. As a result, it is possible to restrain cooling water from residing in an intermediate portion between the pair of water discharge openings without increasing the amount of water supplied, and therefore it is possible to restrain air bubbles from residing in the intermediate portion.

Besides, according to the invention, the restraint of the residence of air bubbles in the water-cooling jacket can be realized by a simple structure in which the bottom portion is formed of the first and second inclined surfaces, without increasing the amount of water supplied. Therefore, increases in the production cost and the running cost of the rolling bearing apparatus can be curbed.

Effects of the Invention

According to the rolling bearing apparatus of the invention, it is possible to restrain the residence of air bubbles in the water-cooling jacket while curbing the running cost and the production cost.

MODES FOR CARRYING OUT THE INVENTION

Figure 1:
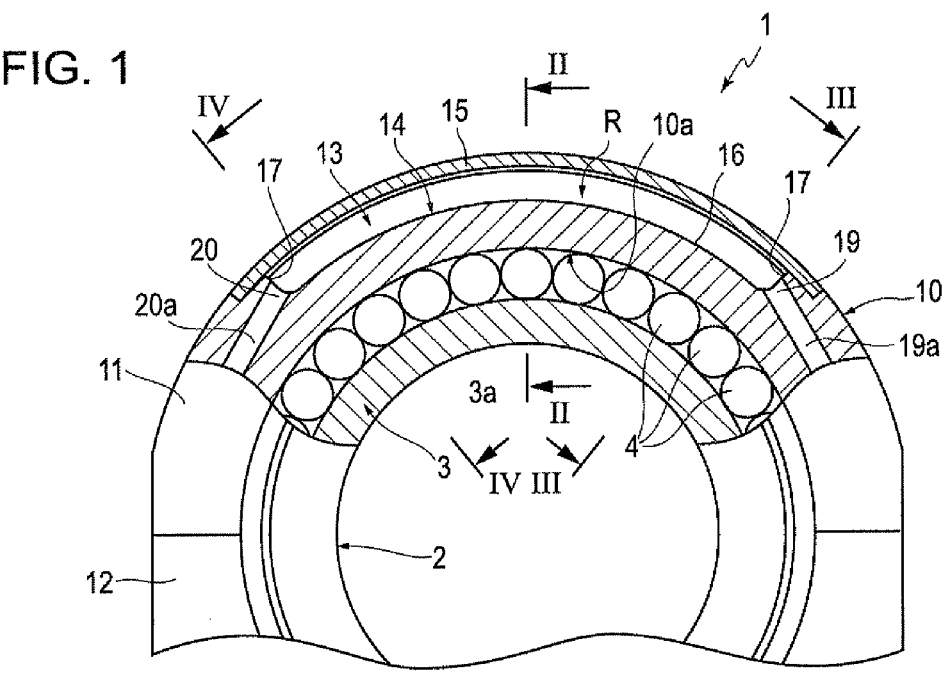
FIG. 1 is a partial sectional view showing a construction of a rolling bearing apparatus in accordance with a first embodiment of the invention.

Next, preferred embodiments of the invention will be described with reference to the accompanying drawings. FIG. 1 is a partial sectional view showing a construction of a rolling bearing apparatus in accordance with a first embodiment of the invention.

In FIG. 1, a rolling bearing apparatus 1 is an apparatus for supporting a drive roll of a continuous casting facility, and is equipped with a rolling bearing 2, and a housing 10 of a circular arc shape in cross section that houses the rolling bearing 2.

The rolling bearing 2 is equipped with an inner ring 3 into whose inner peripheral side a shaft portion of the drive roll is fitted, and a plurality of cylindrical rollers 4 disposed between an outer ring raceway 10a formed in the housing 10 and an inner ring raceway 3a formed on an outer peripheral surface of the inner ring 3.

The housing 10 is formed by a combination of an upper-side portion 11 and a lower-side portion 12, which are integrally fastened together by bolts or the like (not shown). The upper-side portion 11 is disposed at a side close to a slab in the continuous casting facility so as to face the slab. Besides, the lower-side portion 12 is disposed at a side farther from the slab in the continuous casting facility than the upper-side portion 11 is, and is fixed to the continuous casting facility.

Besides, the semicircular outer ring raceway 10a is formed on the inner peripheral side of the upper-side portion 11, as described above. On the inner peripheral side of the lower-side portion 12, there is an outer ring member (not shown) that forms an annular outer ring raceway when combined with the semi-circular semicircular outer ring raceway 10a of the upper-side portion 11. An outer peripheral surface of the outer ring member is formed as a spherical convex curved surface. Besides, the inner peripheral surface of the lower-side portion 12 is formed as such a concave curved surface as to follow the outer peripheral surface of the outer ring member. Therefore, the outer peripheral surface of the outer ring member is slidable so that an axis thereof oscillates relative to the inner peripheral surface of the lower-side portion 12, and the outer ring member has an aligning characteristic relative to the lower-side portion 12.

Thus, the housing 10 has a function as the outer ring of the rolling bearing 2, and also houses the rolling bearing 2 therein.

The upper-side portion 11 of the housing 10 which faces the slab is provided with a water-cooling jacket 13. The water-cooling jacket 13 is used to prevent heat radiated from the slab conveyed by the drive roll from being transmitted to the rolling bearing 2, and is formed of a recess portion 14 formed in the upper-side portion 11, and a lid 15 that, together with the recess portion 14, forms a space R by closing the recess portion 14. The water-cooling jacket 13 prevents radiation heat from the slab from transferring to the rolling bearing 2, because cooling water is introduced into the space R that is surrounded by the recess portion 14 and the lid 15.

Figure 2:
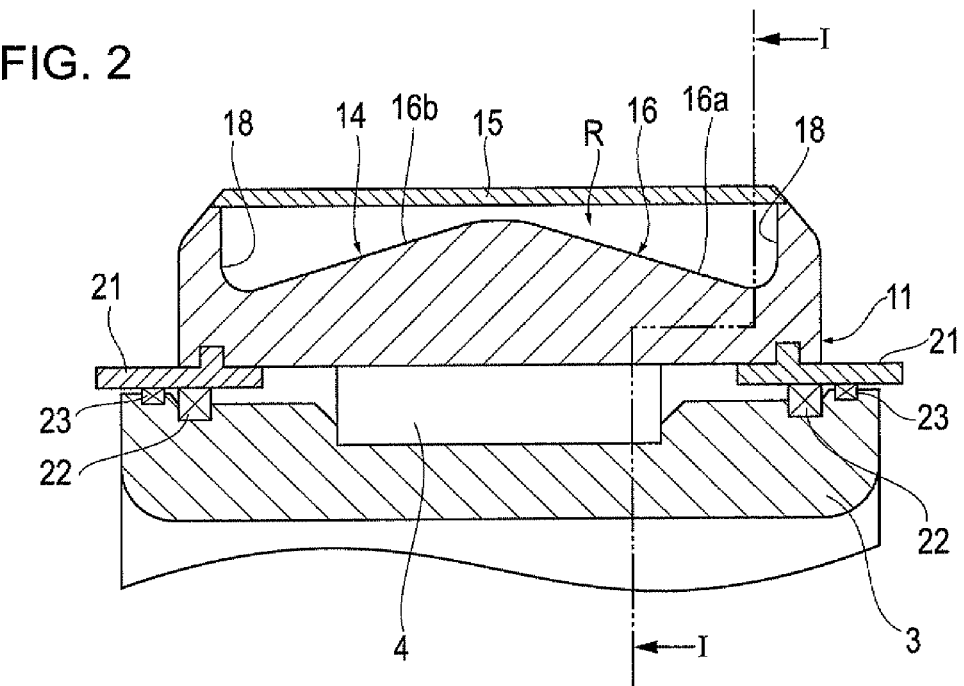
FIG. 2 is a sectional view taken along a line II-II in FIG. 1.
Figure 3:
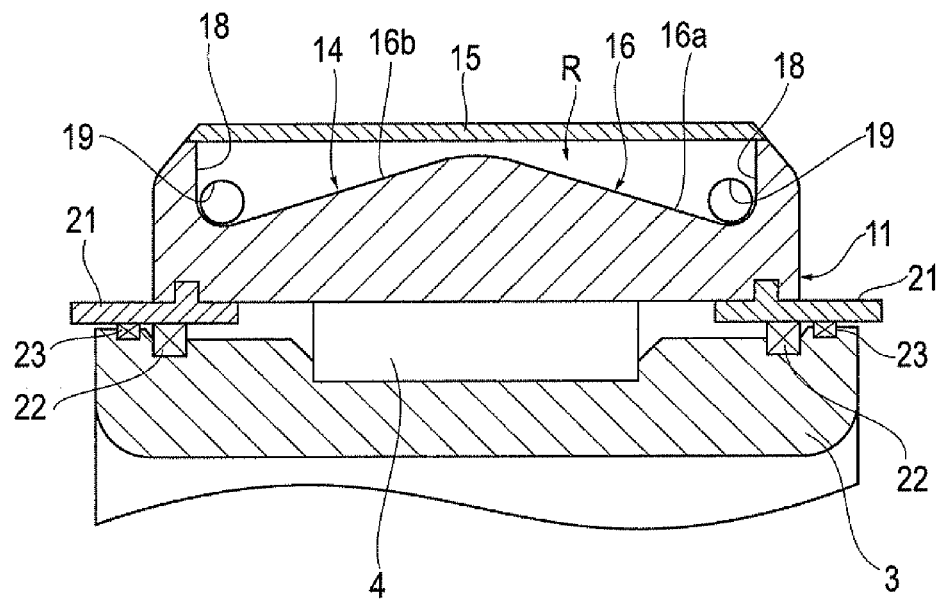
FIG. 3 is a sectional view taken along a line III-III in FIG. 1.
Figure 4:
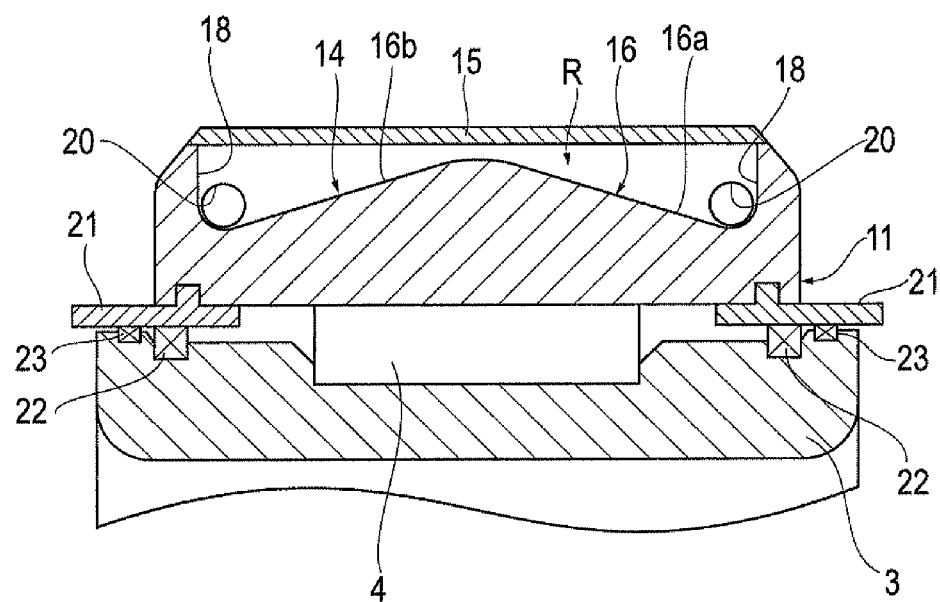
FIG. 4 is a sectional view taken along a line IV-IV in FIG. 1.

FIG. 2 is a sectional view taken along a line II-II in FIG. 1. FIG. 3 is a sectional view taken along a line in FIG. 1. FIG. 4 is a sectional view taken along a line IV-IV in FIG. 1. In FIG. 2, both end portions of an inner peripheral surface of the upper-side portion 11 (lower-side portion 12) are each provided with a labyrinth ring 21 that is protruded outward in the axial direction. The labyrinth rings 21 are each inserted, in a non-contact manner, into an annual groove that is formed on an end surface of each roll (not shown) that faces a corresponding one of both end portions of the upper-side portion 11 (lower-side portion 12), and each form a labyrinth together with the annual groove. Furthermore, between the inner peripheral surface of each labyrinth ring 21 and an outer peripheral surface of the inner ring 3, there is disposed a seal member 22 and a packing 23 for tightly sealing the gap between the two surfaces. The labyrinth rings 21, the seal members 22 and the packings 23 tightly seal an annular gap between the housing 10 and the inner ring 3.

Referring to FIG. 2 to FIG. 4 and FIG. 1, the recess portion 14 is formed so as to be indented radially inward from the outer peripheral surface of the upper-side portion 11, and is formed of: a bottom portion 16 that extends along the outer periphery of the rolling bearing 2; circumferential-direction-end wall portions 17 that are provided at respective end sides of the bottom portion 16 in a circumferential direction and extend in an axial direction and that enclose the respective end sides of the bottom portion 16 in the circumferential direction; and axial direction-end wall portions 18 that are provided at respective end sides of the bottom portion 16 in an axial direction and extend in a circumferential direction and that enclose the respective end sides of the bottom portion 16 in the axial direction.

The recess portion 14 is formed such that the width dimensions thereof in the axial direction and the circumferential direction are substantially uniform. At one end side of the recess portion 14 in the circumferential direction, there are formed paired water supply openings 19. Besides, at the other end side thereof in the circumferential direction, there are formed paired water discharge openings 20. The arrangement of the pair of water supply openings 19 and the pair of water discharge openings 20 in the axial direction is substantially the same as that adopted in the related-art water-cooling jacket shown in FIG. 3, that is, the water supply openings 19 and the water discharge openings 20 are disposed in respective corner portions at the one end side of the recess portion 14 in the circumferential direction and in respective corner portions at the other end side thereof in the circumferential direction, respectively.

The paired water supply openings 19 are connected, via water supply passageways 19*a* provided in the housing 10, to a water supply mechanism (not shown) for supplying cooling water, and therefore introduce cooling water into the space R of the water-cooling jacket 13 which is formed of the recess portion 14 and the lid 15.

Besides, the pair of water discharge openings 20 are connected, via water discharge passageways 20*a* provided in the housing 10, to a water discharge mechanism (not shown) for discharging cooling water, and therefore discharge the cooling water present in the space R of the water-cooling jacket 13.

The bottom portion 16 is formed of a first inclined surface 16*a* that is inclined radially inward from a middle of the bottom portion 16 in the axial direction toward one end portion thereof in the axial direction, and a second inclined surface 16*b* that is inclined radially inward from the middle of the bottom portion 16 in the axial direction toward the other end portion thereof in the axial direction.

These inclined surfaces 16*a* and 16*b* are formed as conical surfaces whose center axis is the axis of the rolling bearing 2. These inclined surfaces 16*a* and 16*b* have been formed by the lathing along circular arcs whose center is the axis of the rolling bearing 2. On these inclined surfaces 16*a* and 16*b*, there are lathe marks of grooves of about 0.1 mm in depth extending in the circumferential directions at intervals of about 5 mm in the axial direction.

According to the rolling bearing apparatus 1 constructed as described above, since the bottom portion 16 is formed of the first inclined surface 16*a* that is inclined radially inward from the middle of the bottom portion 16 in the axial direction to the one end portion thereof in the axial direction and the second inclined surface 16*b* that is inclined radially inward from the middle of the bottom portion 16 in the axial direction toward the other end portion thereof in the axial direction, it is possible to cause the cooling water introduced into the water-cooling jacket 13 through the pair of water supply openings 19 provided at the one end side in the circumferential direction to reach the other end side in the circumferential direction at which the pair of water discharge openings 20 are positioned while rectifying the cooling water to the both sides in the axial direction. As a result, it is possible to restrain cooling water from residing in an intermediate portion between the pair of water discharge openings 20 without increasing the amount of water supplied, and therefore it is possible to restrain air bubbles from residing in the intermediate portion.

Besides, according to the embodiment, the restraint of the residence of air bubbles in the water-cooling jacket 13 can be realized by a simple structure in which the bottom portion 16 is formed of the first and second inclined surfaces 16*a* and 16*b*, without increasing the amount of water supplied. Therefore, increases in the production cost and the running cost of the rolling bearing apparatus 1 can be curbed.

As described above, according to the rolling bearing 1 of this embodiment, it is possible to restrain the residence of air bubbles in the water-cooling jacket 13 while curbing the costs.

Besides, in the embodiment, since the first and second inclined surfaces 16*a* and 16*b* are conical surfaces whose center axis is the axis of the rolling bearing 2, the bottom portion 16 is able to uniformly rectify the cooling water that passes in the circumferential direction inside the water-cooling jacket 13 with respect to the axial direction and the circumferential direction, so that residence of air bubbles in the water-cooling jacket 13 can be more effectively restrained.

Figure 5:
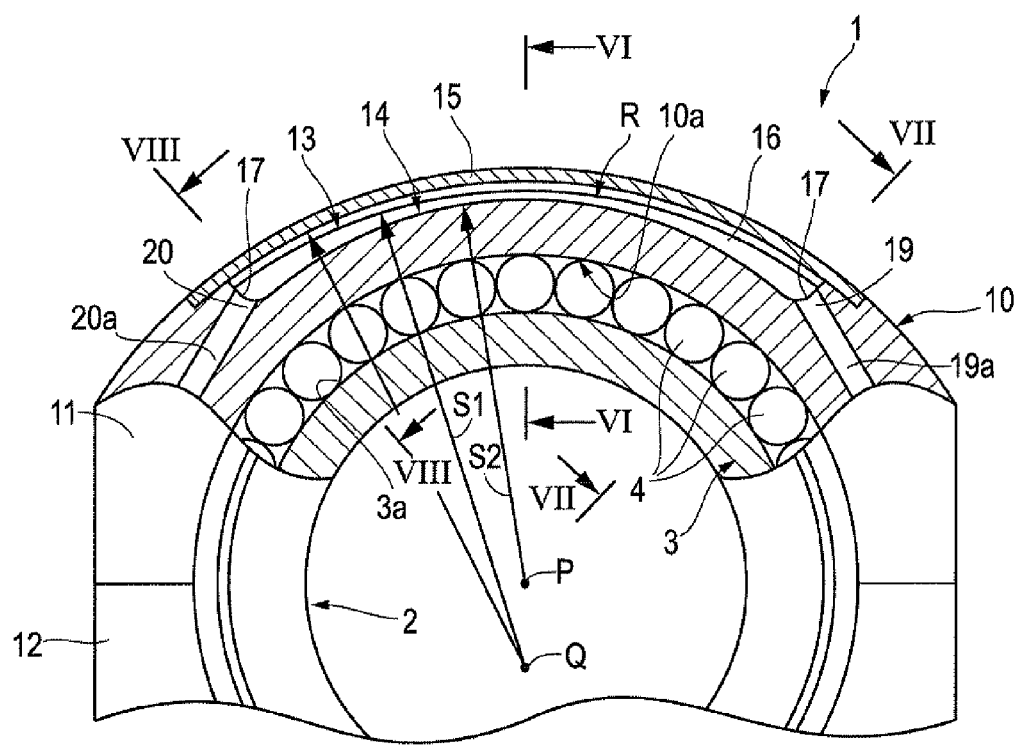
FIG. 5 is a partial sectional view showing a construction of a rolling bearing apparatus in accordance with a second embodiment of the invention.
Figure 6:
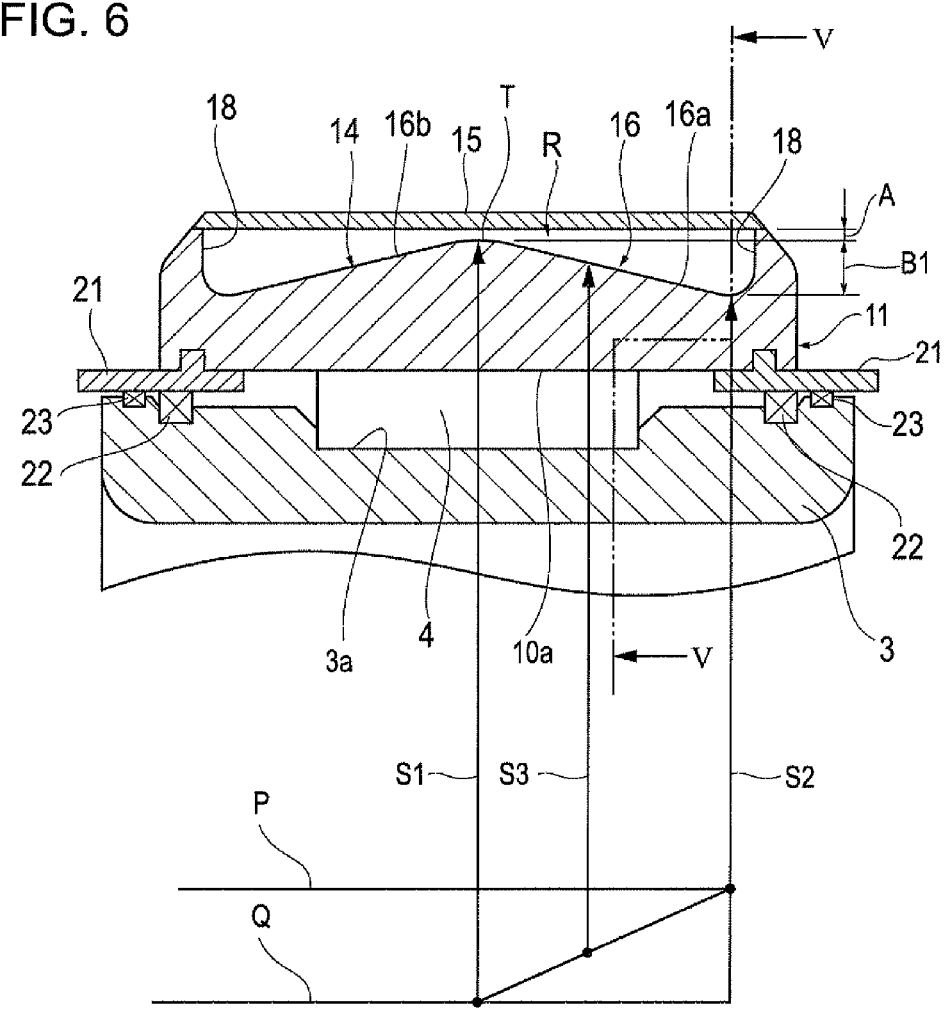
FIG. 6 is a sectional view taken along a line VI-VI in FIG. 5 that is substantially in the middle of a water-cooling jacket in a circumferential direction.
Figure 7:
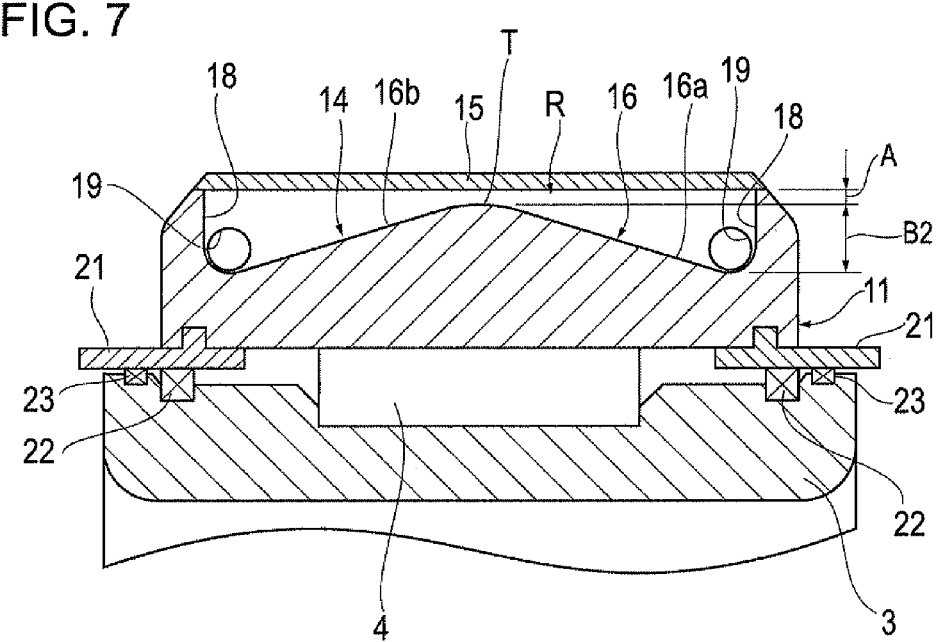
FIG. 7 is a sectional view taken along a line VII-VII in FIG. 5 that is in one end side portion of the water-cooling jacket in the circumferential direction.
Figure 8:
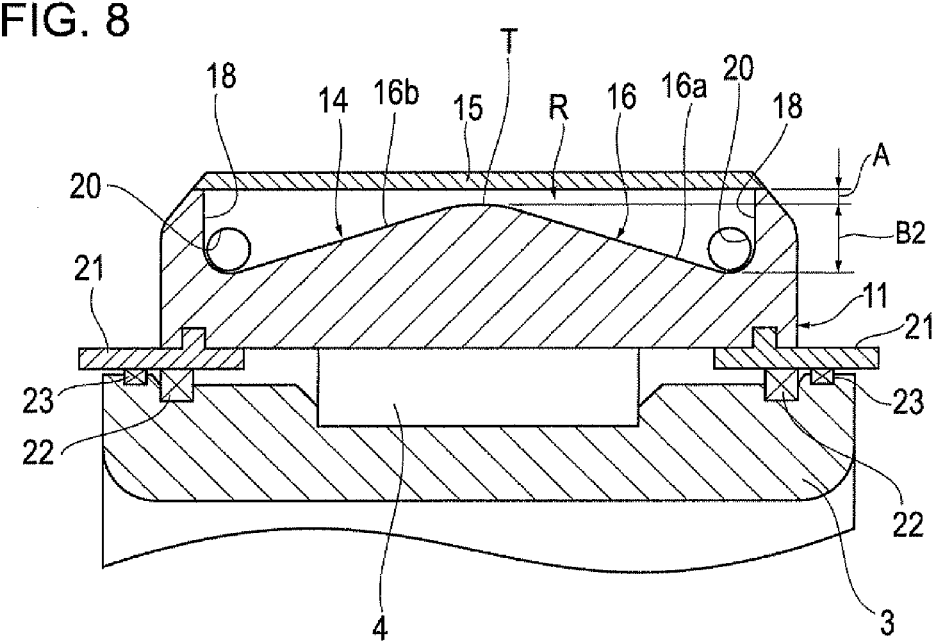
FIG. 8 is a sectional view taken along a line VIII-VIII in FIG. 5 that is in the other end side portion of the water-cooling jacket in the circumferential direction.
Figure 9:
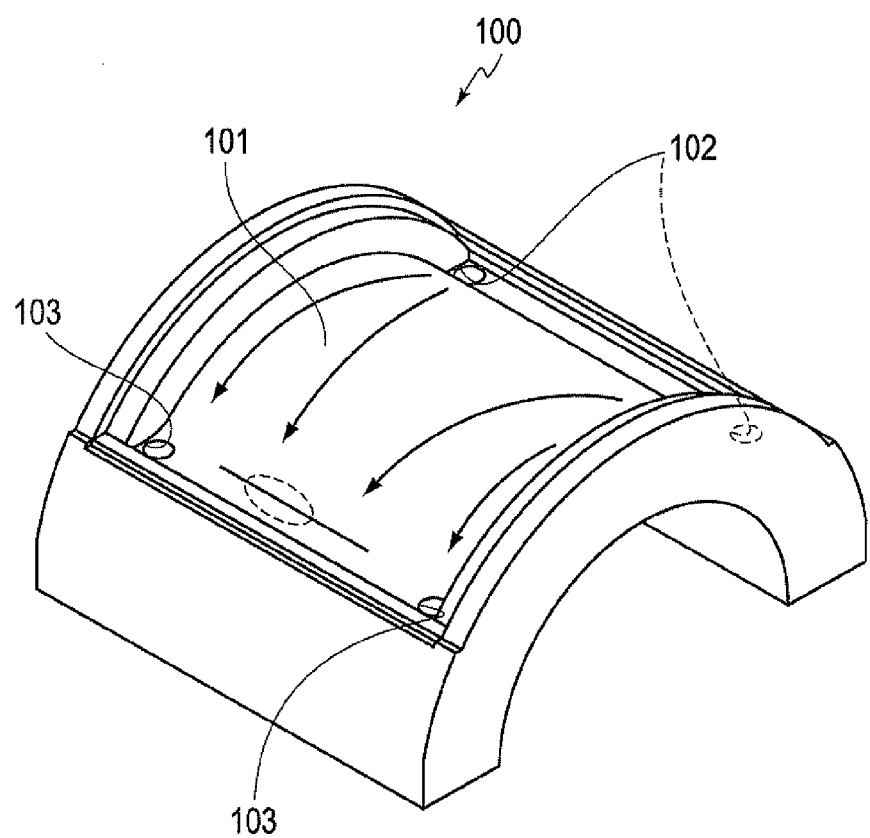
FIG. 9 is an external view showing a state of a water-cooling jacket of a related-art rolling bearing apparatus.

FIG. 5 is a partial sectional view showing a construction of a rolling bearing apparatus in accordance with a second embodiment of the invention. FIG. 6 is a sectional view taken along a line VI-VI in FIG. 5 that is substantially in the middle of the water-cooling jacket 13 in the circumferential direction. FIG. 7 is a sectional view taken along a line VII-VII in FIG. 5 that is in one end side portion of the water-cooling jacket 13 in the circumferential direction. FIG. 8 is a sectional view taken along a line VIII-VIII that is in the other end side portion of the water-cooling jacket 13 in the circumferential direction. Besides, FIG. 5 shows a section taken along a line V-V in FIG. 6, and FIGS. 6 to 8 show sections taken along the axial direction of the rolling bearing 2.

A difference of this embodiment from the first embodiment is that the first inclined surface 16*a* is curved and inclined from a middle of the bottom portion 16 in the axial direction toward one end portion thereof in the axial direction such that the height of the middle of the bottom portion 16 in the axial direction which is measured in a radial direction of the rolling bearing 2 relative to the one end portion of the bottom portion 16 in the axial direction in a section of the recess portion 14 taken along the axial direction which contains the center axis of the rolling bearing 2 increases gradually from a middle of the bottom portion 16 in the circumferential direction toward respective end sides thereof in the circumferential direction, and that a second inclined surface 16*b* is curved and inclined from the middle of the bottom portion 16 in the axial direction toward the other end portion thereof in the axial direction such that the height of the middle of the bottom portion 16 in the axial direction which is measured in the radial direction of the rolling bearing 2 relative to the other end portion of the bottom portion 16 in the axial direction in a section of the recess portion 14 in the axial direction which contains the center axis of the rolling bearing 2 increases gradually from the middle of the bottom portion 16 in the circumferential direction toward the respective end sides thereof in the circumferential direction.

In FIG. 5, an upper-side peripheral surface of the housing 10 in the embodiment is formed in a circular arc shape whose center is an axis Q that is positioned at a lower side (a side remote from the slab) of an axis P of the inner ring 3 (a center axis of the rolling bearing 2). Correspondingly, inner and outer peripheral surfaces of the lid 15 are also formed in a circular arc shape whose center is the axis Q. The axis Q is positioned at the lower side of the axis P (at a side thereof remote from the slab) of the inner ring 3 in the direction of a diameter of the rolling bearing apparatus that connects the middle of the bottom portion 16 in the circumferential direction and the axis P of the inner ring 3 (the center axis of the rolling bearing 2).

In the bottom portion 16 in the embodiment, a middle T of the bottom portion 16 in the axial direction thereof is the nearest to the inner peripheral surface of the lid 15. Besides, the middle T of the bottom portion 16 in the axial direction is formed in a shape of a circular arc that is concentric with the inner peripheral surface of the lid 15 and is smaller in radius than the inner peripheral surface of the lid 15 (the shape of a circular arc whose center is the point Q). Therefore, as shown in FIG. 6 to FIG. 8, an interval A between the inner peripheral surface of the lid 15 and the middle T of the bottom portion in the axial direction is a substantially constant dimension in the water-cooling jacket 13.

Besides, the both end portions of the bottom portion 16 in the axial direction are formed in a shape of a circular arc whose center is an axis P of the inner ring 3, and whose radius is set such that, in the middle of the bottom portion 16 in the circumferential direction, a radial height between the middle of the bottom portion 16 in the axial direction and the both end portions of the bottom portion 16 in the axial direction is a dimension B1.

The first inclined surface 16*a* is in a circular arc shape in a view in the circumferential direction. The circular arc of the first inclined surface 16*a* is formed such that, in a sectional view of the recess portion 14 taken along the axial direction, the surface is inclined radially inward from the middle T of the bottom portion 16 in the axial direction toward one end portion thereof in the axial direction by gradually changing the center of the circular arc from the axis Q to the axis P according to the position in the axial direction in a range from the middle T of the bottom portion 16 in the axial direction to the one end portion thereof in the axial direction and by gradually lessening the radius of the arc according to location in the range in the axial direction.

That is, the middle T of the bottom portion 16 in the axial direction is formed, as shown in FIG. 6, in a circular arc shape of a radius S1 whose center is the axis Q, and the one end portion of the bottom portion 16 in the axial direction is formed in a circular arc shape of a radius S2 whose center is the axis P. Besides, as for the circular arc of an intermediate portion between the middle T in the axial direction and the one end portion in the axial direction, the center of the circular arc is set by proportionally changing it from the axis P to the axis Q according to the position of the intermediate portion in the axial direction, and the radius S3 of the circular arc of the portion is set by proportionally changing it according to the position of the portion in the axial direction.

Therefore, the first inclined surface 16*a* is curved and inclined so as to smoothly connect the middle T of the bottom portion 16 in the axial direction and the one end portion of the bottom portion 16 in the axial direction which has the shape of a circular arc that has a smaller radius than the circular arc of the middle T of the bottom portion in the axial direction. A radial height dimension B2 (FIG. 7 and FIG. 8) of the middle T of the bottom portion 16 in the axial direction relative to the one end portion of the bottom portion 16 in the axial direction in each of both end portions of the water-cooling jacket 13 in the circumferential direction is higher than the radial height direction B1 (FIG. 6) thereof in the middle portion of the water-cooling jacket 13 in the circumferential direction.

Thus, the first inclined surface 16*a* is curved and inclined radially inward from the middle T of the bottom portion 16 in the axial direction to the one end portion thereof in the axial direction such that the height of the middle of the bottom portion 16 in the axial direction measured in a radial direction of the rolling bearing 2 relative to the one end portion of the bottom portion 16 in the axial direction in a cross-section of the recess portion 14 in the axial direction which contains the center axis of the rolling bearing 2 increases gradually from the middle of the bottom portion 16 in the circumferential direction to each of both end portions thereof in the circumferential direction.

Besides, the second inclined surface 16*b* is formed substantially in the same manner as the first inclined surface 16*a*, that is, is curved and inclined radially inward from the middle T of the bottom portion 16 in the axial direction to the other end portion thereof in the axial direction such that the height of the middle of the bottom portion 16 in the axial direction measured in the radial direction of the rolling bearing 2 relative to the other end portion of the bottom portion 16 in the axial direction in the section of the recess portion 14 in the axial direction which contains the center axis of the rolling bearing 2 increases gradually from the middle of the bottom portion 16 in the circumferential direction to each of both end sides thereof in the circumferential direction.

That is, in the rolling bearing apparatus 1 of the embodiment, the middle T of the bottom portion 16 in the axial direction is formed in a circular arc shape that is concentric with the inner peripheral surface of the lid 15 and that is smaller in radius than the inner peripheral surface thereof, and the first inclined surface 16*a* is curved and inclined from the middle T of the bottom portion 16 in the axial direction to the one end portion thereof in the axial direction so that the gap between the one end portion of the bottom portion 16 in the axial direction and the inner peripheral surface of the lid 15 increases gradually from the middle of the bottom portion 16 in the circumferential direction to each of the both end sides thereof in the circumferential direction, and the second inclined surface 16*h* is curved and inclined from the middle T of the bottom portion 16 in the axial direction to the other end portion thereof in the axial direction so that the gap between the other end portion of the bottom portion 16 in the axial direction and the inner peripheral surface of the lid 15 increases gradually from the middle of the bottom portion 16 in the circumferential direction to each of both end sides thereof in the circumferential direction.

In order to form the first and second inclined surfaces 16*a* and 16*b*, the surfaces are lathed so as to form circular arcs in the circumferential direction each of which has a circular arc center and a circular arc radius that are commensurate with the position thereof in the axial direction, at every predetermined pitch (of, for example, several millimeters) in the axial direction. Therefore, on the both inclined surfaces 16*a* and 16*b*, there are formed many lathed grooves of about 0.1 millimeter in depth extending along the circumferential direction at a pitch of several millimeters in the axial direction.

In the embodiment, the middle T of the bottom portion 16 in the axial direction is the nearest to the inner peripheral surface of the lid 15, and an interval (A) of the middle T of the bottom portion 16 from the inner peripheral surface is substantially constant along the circumferential direction. Therefore, the cooling water introduced to the first inclined surface 16a and the cooling water introduced to the second inclined surface 16b can be moderately rectified so as not to excessively mix together. As a result, occurrence of air bubbles can be more effectively prevented.

Besides, the bottom portion 16 is formed such that the height of the middle of the bottom portion 16 in the axial direction relative to the both end portions of the bottom portion 16 in the axial direction which is measured in a radial direction of the rolling bearing 2 increases gradually from the middle of the bottom portion 16 in the circumferential direction to each of the both end sides in the circumferential direction, so that while the both inclined surfaces 16a and 16b are provided in a suitable shape, a large size of the water supply openings 19 and the water discharge openings 20 can be secured and the supply and discharge of the cooling water can be smoothly carried out.

Incidentally, the invention is not limited to the foregoing embodiments. Although in the foregoing embodiment, the first and second inclined surfaces 16a and 16b are formed as conical surfaces, the first and second inclined surfaces 16a and 16b may be in any shapes as long as they are inclined radially inward from the middle in the axial direction toward one end portion in the axial direction; for example, the first and second inclined surfaces 16a and 16b may be convex curved surfaces or concave curved surfaces, and the angle of inclination can be appropriately set according to the size or the like of the water-cooling jacket 13.

Besides, although a case where the rolling bearing 1 is a cylindrical roller bearing has been illustrated as an example in conjunction with the embodiments, the invention is also applicable to other ball bearings, such as angular ball bearings and the like, and also to roller bearings such as cylindrical roller bearings, conical roller bearings, self-aligning roller bearings; etc.

According to the rolling bearing apparatus of the invention, since the bottom portion is formed of the first inclined surface that is inclined radially inward from the middle portion of the bottom portion in the axial direction toward one end portion thereof in the axial direction and the second inclined surface that is inclined radially inward from the middle portion thereof in the axial direction toward the other end portion thereof in the axial direction, it is possible to cause the cooling water introduced into the water-cooling jacket through the pair of water supply openings provided at one end side in the circumferential direction to reach the other end side in the circumferential direction at which the paired water discharge openings are positioned, while rectifying the cooling water to the both sides in the axial direction. As a result, it is possible to restrain cooling water from residing in an intermediate portion between the pair of water discharge openings without increasing the amount of water supplied, and to restrain air bubbles from residing in the intermediate portion.

Besides, according to the invention, restraint of the residence of air bubbles in the water-cooling jacket can be realized by a simple structure in which the bottom portion is formed of the first and second inclined surfaces without increasing the amount of water supplied, so that increases in the production cost of the rolling bearing apparatus and the running cost thereof can be curbed.

In the foregoing rolling bearing apparatus, it is preferable that the first and second inclined surfaces be conical surfaces whose center axis is the axis of the rolling bearing.

In this case, the bottom portion is able to uniformly rectify the cooling water that passes in the circumferential direction within the water-cooling jacket with respect to the axial direction and the circumferential direction, and therefore is able to more effectively restrain air bubbles from residing.

Besides, in the rolling bearing apparatus, it is preferable that the middle of the bottom portion in the axial direction be formed in a circular arc shape that is concentric with the inner peripheral surface of the lid and that is smaller in radius than the inner peripheral surface, and that the first inclined surface be curved and inclined from the middle of the bottom portion in the axial direction toward one end portion thereof in the axial direction such that the height of the middle of the bottom portion in the axial direction relative to the end portion of the bottom portion in the axial direction which is measured in a radial direction of the rolling bearing in a section of the recess portion in the axial direction which contains the center axis of the rolling bearing increases gradually from the middle of the bottom portion in the circumferential direction toward each of the both end sides thereof in the circumferential direction, and that the second inclined surface be curved and inclined from the middle of the bottom portion in the axial direction toward the other end portion thereof in the axial direction such that the height of the middle of the bottom portion in the axial direction relative to the other end portion of the bottom portion in the axial direction which is measured in the radial direction of the rolling bearing in the section of the recess portion in the axial direction which contains the center axis of the rolling bearing increases gradually from the middle of the bottom portion in the circumferential direction toward each of the both end sides thereof in the circumferential direction.

In this case, since the middle of the bottom portion in the axial direction is the nearest to the inner peripheral surface of the lid and the interval of the middle of the bottom portion from the inner peripheral surface is substantially constant along the circumferential direction, the cooling water introduced to the first inclined surface and the cooling water introduced to the second inclined surface can be moderately rectified so as not to excessively mix together. As a result, occurrence of air bubbles can be more effectively prevented.

DESCRIPTION OF REFERENCE NUMERALS

1. ROLLING BEARING APPARATUS
2. ROLLING BEARING
10. HOUSING
13. WATER-COOLING JACKET
14. RECESS PORTION
15. LID
16. BOTTOM PORTION
16a. FIRST INCLINED SURFACE
16b. SECOND INCLINED SURFACE
19. WATER SUPPLY OPENING
20. WATER DISCHARGE OPENING
R. SPACE

The invention claimed is:
1. A rolling bearing apparatus having a rolling bearing, and a housing which houses the rolling bearing and in which a water-cooling jacket is formed into which cooling water is introduced, the water-cooling jacket comprising:
a recess portion that is indented radially inward from an outer peripheral surface of the housing and that has a bottom portion that extends along an outer periphery of the rolling bearing; and a lid that, together with the recess portion, forms a space into which the cooling water is introduced, by closing the recess portion, wherein paired water supply openings are formed in respective corner portions at one end side of the recess portion in a circumferential direction, and paired water discharge openings are formed in respective corner portions at the other end side of the recess portion in the circumferential direction, wherein the bottom portion is formed of: a first inclined surface that is inclined radially inward from a middle of the bottom portion in an axial direction toward one end portion of the bottom portion in the axial direction; and a second inclined surface that is inclined radially inward from the middle of the bottom portion in the axial direction toward the other end portion of the bottom portion in the axial direction, wherein the middle of the bottom portion in the axial direction is formed in a circular arc shape that is concentric with an inner peripheral surface of the lid and that is smaller in radius than the inner peripheral surface, wherein the first inclined surface is curved and inclined from the middle of the bottom portion in the axial direction toward the one end portion of the bottom portion in the axial direction such that a height of the middle of the bottom portion in the axial direction relative to the one end portion of the bottom portion in the axial direction increases from a middle of the bottom portion in the circumferential direction toward each of both end sides of the bottom portion in the circumferential direction, the first inclined surface is in a circular arc shape in a view in the circumferential direction, the circular arc of the first inclined surface is formed such that, in a sectional view of the recess portion taken along the axial direction, the surface is inclined radially inward from the middle of the bottom portion in the axial direction toward one end portion thereof in the axial direction by changing a radial location of the center of the circular arc according to the position in the axial direction in a range from the middle of the bottom portion in the axial direction to the one end portion thereof in the axial direction and by lessening the radius of the arc according to location in the range in the axial direction, and wherein the second inclined surface is curved and inclined from the middle of the bottom portion in the axial direction toward the other end portion of the bottom portion in the axial direction such that the height of the middle of the bottom portion in the axial direction relative to the other end portion of the bottom portion in the axial direction which is measured in the radial direction of the rolling bearing in the section of the recess portion in the axial direction which contains the center axis of the rolling bearing increases from the middle of the bottom portion in the circumferential direction toward each of the both end sides of the bottom portion in the circumferential direction, the second inclined surface is in a circular arc shape in a view in the circumferential direction, the circular arc of the second inclined surface is formed such that, in a sectional view of the recess portion taken along the axial direction, the surface is inclined radially inward from the middle of the bottom portion in the axial direction toward one end portion thereof in the axial direction by changing a radial location of the center of the circular arc according to the position in the axial direction in a range from the middle of the bottom portion in the axial direction to the one end portion thereof in the axial direction and by lessening the radius of the arc according to location in the range in the axial direction.

2. The rolling bearing apparatus according to claim 1, wherein the first and second inclined surfaces each are a conical surface whose center axis is an axis of the rolling bearing.

* * * * *